Aug. 2, 1927.

C. B. CUSHWA 1,637,411

PALLET

Original Filed June 14, 1924   3 Sheets-Sheet 1

INVENTOR
Charles B. Cushwa,
by Byrnes, Stebbins, Parmelee,
his attys.

Aug. 2, 1927. 1,637,411
C. B. CUSHWA
PALLET
Original Filed June 14, 1924   3 Sheets-Sheet 2
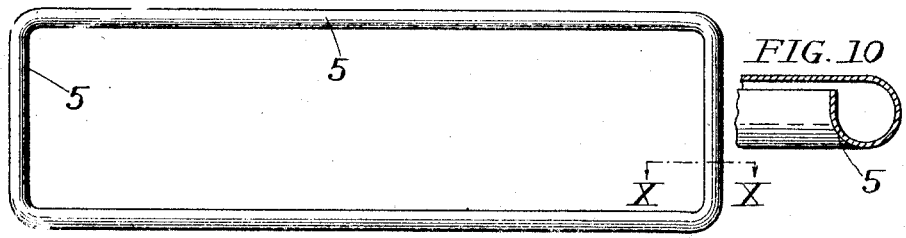
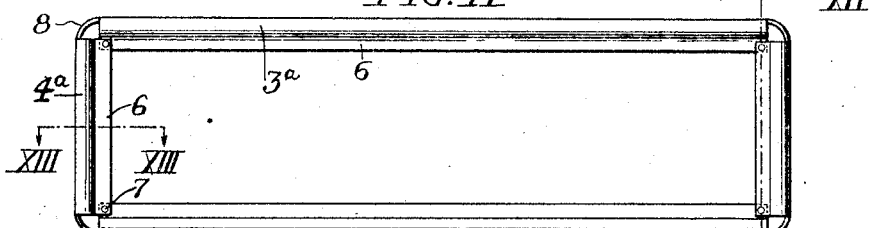
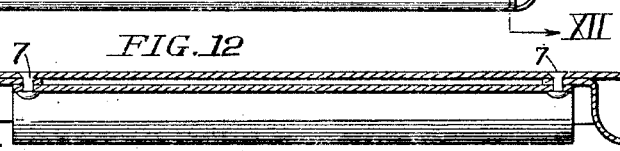
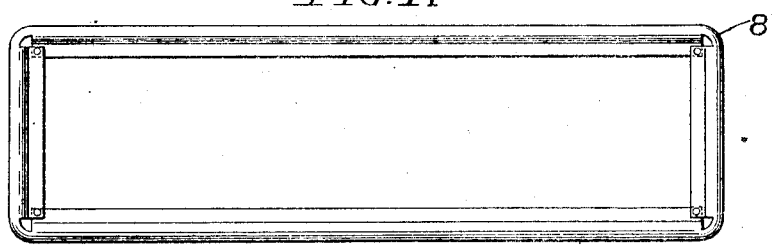
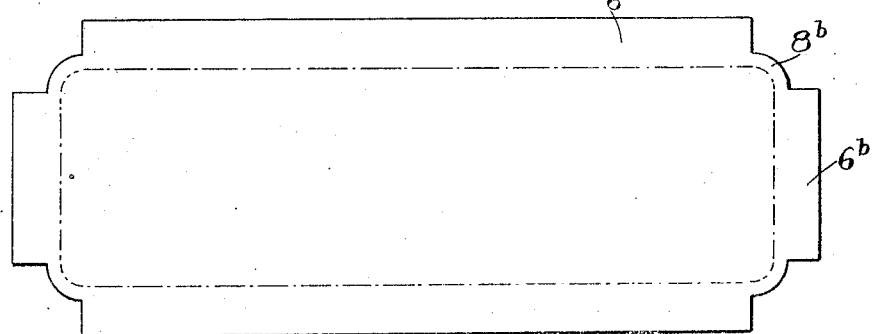
INVENTOR
Charles B. Cushwa.

Aug. 2, 1927.

C. B. CUSHWA

PALLET 1,637,411

Original Filed June 14, 1924   3 Sheets-Sheet 3

INVENTOR
Charles B. Cushwa

Patented Aug. 2, 1927.

1,637,411

UNITED STATES PATENT OFFICE.

CHARLES B. CUSHWA, OF YOUNGSTOWN, OHIO, ASSIGNOR TO THE COMMERCIAL SHEARING AND STAMPING COMPANY, OF YOUNGSTOWN, OHIO, A CORPORATION OF OHIO.

PALLET.

Application filed June 14, 1924, Serial No. 720,082. Renewed March 1, 1926.

The present invention relates broadly to pallets, and more particularly to pallets of the character required for use in the manufacture of bricks.

At the present time it is customary to utilize sheet metal pallets in the art to which this invention relates for the purpose of supporting the materials forming the brick during the pressing or tamping thereof and for facilitating the transfer of the formed brick to a conveyor, kiln, or the like. As usually constructed, such sheet metal pallets have had either the ends or sides, or both, bent or rolled downwardly to reinforce the pallet. The blank on which the pallet has been made, however, has been so shaped that the flange or bead so formed has not been continuous, there being a break at each of the corners.

It is contemplated that during the transfer of bricks from the forming machine, the pallet will be gripped or supported in both hands along substantially the longitudinal central portion thereof. As a matter of fact, however, it is common practice for the operative to grasp the pallet on one end adjacent the corner, and usually on one of the longer side edges. This provides a considerable overhang with the result that the weight of the brick tends to bend the pallet. Due to the break in the flange or beading at the corners, the pallet is weakest along its diagonals and accordingly tends to bend along these lines. After such a pallet has been used a short time, the upper surface thereof is no longer flat enough to form a perfect brick, and furthermore the pallet becomes so weakened that it does not constitute an effective support or means of transfer.

The present invention contemplates an improved form of pallet having substantially uniform strength throughout the entire body thereof by reason of a flange or bead which is continuous at the corners. A further object of the present invention, in accordance with one embodiment thereof, constitutes a construction of beading which is so secured to the body of the pallet as to prevent any possibility of weaving or relative movement between the inner portion of the bead and the body.

In the accompanying drawings, there are shown, for purposes of illustration only, certain embodiments of the present invention, it being understood that the drawings do not define the limits of the invention, as changes in the constructions disclosed therein and the method of making the same may be made without departing from the spirit of the invention or the scope of my broader claims.

In the drawings—

Figure 9 is an inverted plan view illustrating a pallet with a continuous beaded flange;

Figure 10 is a detail sectional view, on an enlarged scale, along the line X—X of Figure 9;

Figure 11 is an inverted plan view of still another embodiment of the invention;

Figure 12 is a transverse sectional view, on an enlarged scale, on the line XII—XII of Figure 11;

Figure 13 is a detail sectional view, on an enlarged scale, along the line XIII—XIII of Figure 11;

Figure 14 is a view similar to Figure 11, illustrating a slightly modified form of the invention;

Figure 15 is a plan view of a blank for forming the pallet illustrated in Figures 11 to 13, inclusive.

Figures 16, 17, 18, 19 and 20 are views corresponding respectively to Figures 1, 3, 5, 7 and 11, but illustrating a pallet having square corners, different forms of corners being shown in the different figures; and Figures 21, 22, 23, 24 and 25 are perspective views on enlarged scales, illustrating in detail different forms of corners.

In connection with the forms of the invention illustrated more particularly in Figures 1 to 15, I have found that with a standard pallet which may have approximately the dimensions 9 in. x 30 in. with a total thickness, including the flanges or beading, of ¾ in., it is possible to form a continuous flange, either straight or rolled, by so shaping the blank and the forming dies as to provide curved corners having a radius of approximately one inch. This radius is not objectionable from a standpoint of use of the pallet and therefore may be advantageously used in the construction of certain pallets. It will be understood that the dimensions herein recited are by way of illustration only and are not used in a limiting sense, it being possible to construct pallets of any desired over-all dimensions and with varying degrees of curvature at the corners.

Figure 1:
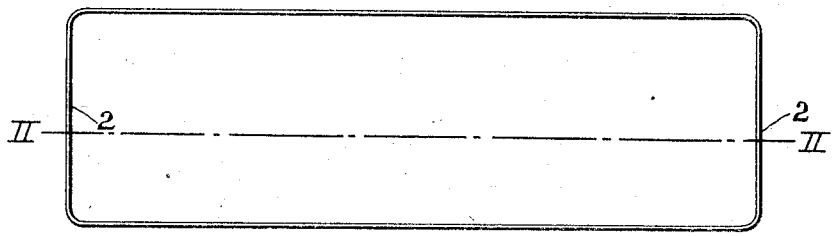
Figure 1 is an inverted plan view of one form of pallet embodying the present invention.
Figure 2:
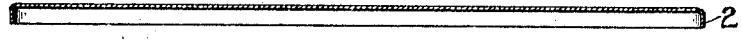
Figure 2 is a longitudinal sectional view on the line II—II of Figure 1, the pallet being shown in its normal supporting position.

In constructing a pallet as shown in Figures 1 and 2, there is provided a substantially rectangular blank having the corners rounded as required. This blank is then shaped in suitable dies to provide a continuous flange entirely around the perimeter of the pallet. This provides a pallet which does not present weakened lines along the diagonals thereof, thereby enabling it to be used in accordance with the common practice in the art.

Figure 3:
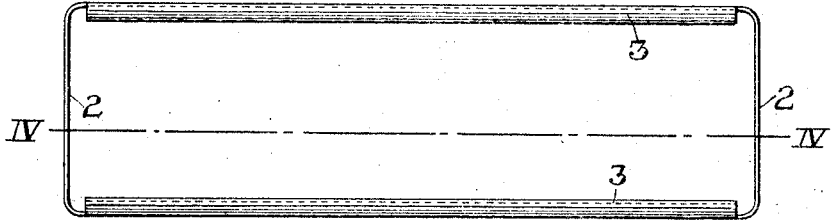
Figure 3 is a view similar to Figure 1, illustrating a modified form of the invention.
Figure 4:
Figure 4 is a view similar to Figure 2, taken along the line IV—IV of Figure 3.

In some instances it is desirable to slide a pallet longitudinally at different times during the handling thereof, and to facilitate such a movement, the pallet may be constructed as illustrated in Figures 3 and 4. In this form of the invention the end flanges 2 are the same as shown in Figure 1, while the side flanges substantially in, but preferably slightly below, the plane of the bottom edges of the flanges 2 are bent or rolled inwardly to provide curved beads 3. It will be understood that for forming pallets of this character the flanges will have the general shape before referred to, but will have a slightly greater width to provide for the beads 3.

Figure 5:
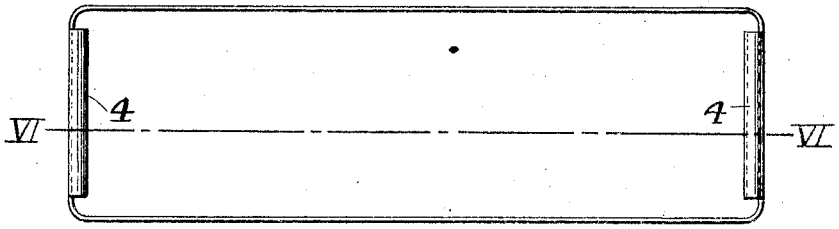
Figure 5 is an inverted plan view of another form of the invention.
Figure 6:
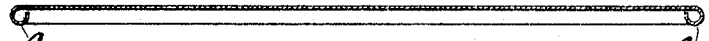
Figure 6 is a view similar to Figure 2 but taken on the line VI—VI of Figure 5.

In still other cases it may be desirable to provide a pallet having end beads 4, as shown in Figures 5 and 6, with straight side flanges and corners. Such a pallet may be easily constructed by providing the excess metal in the length thereof.

Figure 7:
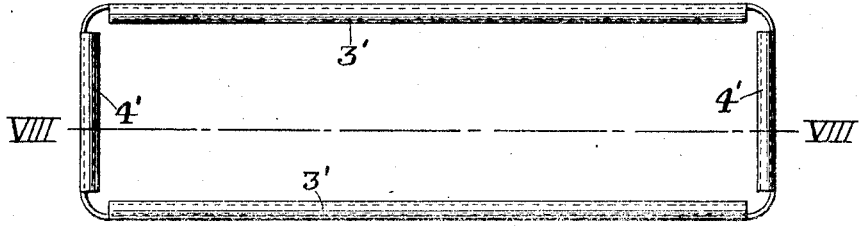
Figure 7 is an inverted plan view illustrating a further embodiment containing the features of construction of both Figures 3 and 5.
Figure 8:
Figure 8 is a partial longitudinal sectional view along the line VIII—VIII of Figure 7.

In Figures 7 and 8 there is shown a pallet embodying the advantageous features of construction of both the preceding forms. In this embodiment the pallet has both the beaded side flanges 3′ and the beaded end flanges 4′. It will be understood that where such beads are provided they serve the additional purpose of considerably thickening the flange, thereby providing a better holding edge or surface.

In many cases it may be desirable to provide a continuous rolled bead 5 on the bottom of the pallet, as illustrated in Figures 9 and 10, whereby a uniform gripping, supporting and reinforcing flange is insured. This construction is made possible by reason of the curving of the corners as before referred to.

I have found that with a pallet constructed in accordance with Figure 7 where subjected to severe use, there may be a slight tendency for the body of the pallet to become distorted due to a slight weaving or relative movement between the beads and the body. This objectionable tendency may be effectively overcome by constructing a pallet as shown in Figures 11 to 13, both inclusive, in which the beads 3ª and 4ª are provided with horizontally extending flanges 6 overlapping at the corners as indicated and secured in position by suitable fastening means, such as rivets 7, passing therethrough. These rivets not only secure the flanges to each other but secure the flanges to the body of the pallet and prevent any possibility of a sliding between the adjacent surfaces such as would tend to permit distortion of the pallet. It will be noted that in Figure 11 the pallet is shown as having straight flanges 8 at the corners thereof. In Figure 14 there is illustrated a blank substantially as shown in Figure 11 but having at the corners a slightly beaded or rolled flange 8′. This insures a continuous broad lower surface, further increasing the ease with which the pallet may be handled.

In Figure 15 there is illustrated in plan view a blank from which the pallet shown in Figures 11 and 13 may be constructed, the outline of the pallet being indicated in this figure in chain lines. The blank is provided at the corners with projections 8ᵇ adapted to be bent downwardly to form the flanges 8 shown in Figure 11. It is also provided with side and end projections 6ᵇ adapted to be bent inwardly to form beaded side and end flanges 3ª and 4ª and laterally projecting flanges 6. It will be understood that where the pallet shown in Figure 14 is to be produced, there will be provided a slightly greater body of metal 8ᵇ at the corners to permit the forming not only of the straight flange portion 8 but also the curved portion 8'. Figure 15 further illustrates the fundamental shape required for the forming of the pallets of all of the figures hereinbefore referred to, it being apparent that by omitting either the end or the side portions of the blank beyond that actually required for forming a straight flange, there can be formed a pallet having any of the desired characteristics.

Figure 16:
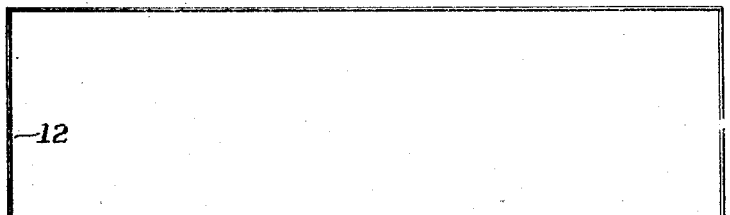
Figure 22:
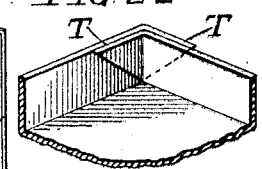
Figure 23:
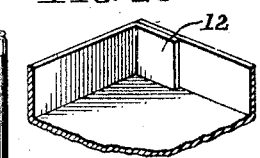
Figure 24:
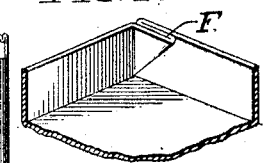
Figure 25:
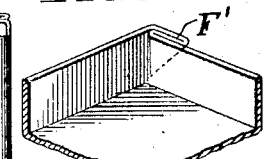

In certain cases it becomes necessary or desirable to provide a pallet having square corners. In Figure 16 there is shown in bottom plan view a pallet corresponding to the pallet shown in Figure 1 but having a continuous edge flange 12 and formed with square corners. In Figures 21 to 25, inclusive, there are shown in detail different preferred methods of forming the square corners. In the form illustrated in Figure 21, there is shown a corner formed by notching the blank and bringing the cut edges into abutting relationship and welding the same to form a joint J. In Figure 22 the corner is formed by splitting the blank to bisect the same and provide triangular portions T which are subsequently overlapped and secured in position as indicated. In the form of Figure 23, the blank is sheared along a straight line corresponding to the line of fold and the rectangular portion R so formed subsequently bent into position along one of the ends or sides as shown in this figure. It will be understood that this portion may be secured in position either inside or outside of the portion with which it contacts. Ordinarily, however, in order to provide a smooth outer flange surface, it is desirable to bend it inwardly as illustrated. In Figure 24 there is illustrated a folded joint F against one of the sides or edges of the flange, while in Figure 25 a similar joint F' is shown, the joint F', however, being illustrated as outside of one of the flanges. Any one of the joints illustrated in these figures may be utilized in connection with any one of the pallets shown in Figures 16 to 20, both inclusive, it being obvious that in any case a continuous flange is insured.

Figure 17:
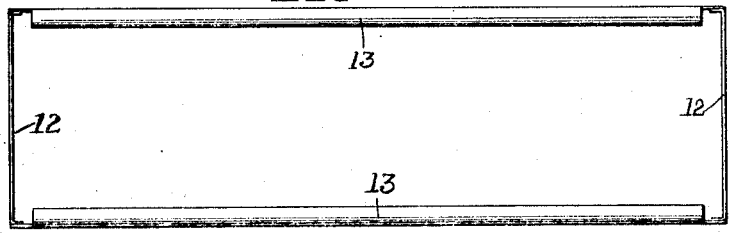
Figure 18:
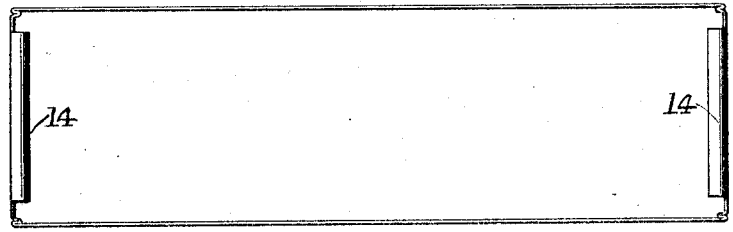
Figure 19:
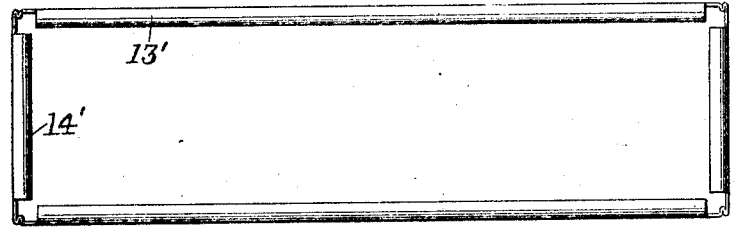
Figure 20:
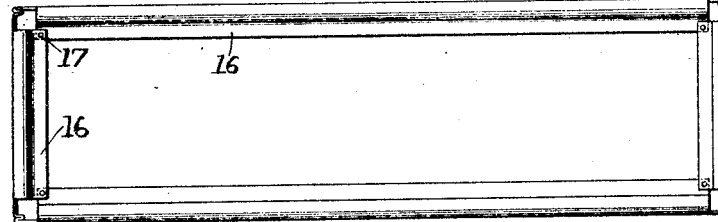
Figure 21:
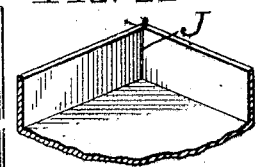

In Figure 17 the rectangular blank is shown as having straight end flanges 12 with beaded side flanges 13 substantially as shown in Figure 3. In Figure 18 the pallet is shown as having straight side flanges with beaded end flanges 14 corresponding to the general construction of Figure 5. In Figure 19 the pallet has both the beaded side flanges 13' and end flanges 14', while in Figure 20 there are shown the laterally projecting flanges 16 with the securing means 17. In the Figures 16 to 20, different forms of joints are illustrated with the different constructions, it being understood, however, that these illustrations are merely for the purpose of showing the universality of the joint structure with respect to the pallet construction.

The advantages of the present invention arise from the provision of a pallet having a reinforcing means which is continuous at the corners, such reinforcing means preferably being in the form of a flange. Further advantages arise from the provision of a pallet so designed that the flange may either have beaded side and/or end portions, and these portions formed with flanges which may in turn be secured to the body of the pallet.

A sheet metal pallet as herein constructed is exceedingly light, thereby adding no appreciable weight while possessing a maximum strength.

I claim:

1. As an article of manufacture, a pallet having a curved bead on the ends and sides thereof, said bead having overlapping projecting flanges secured to the body of the pallet, there being a reinforcing flange at the corners of the pallet, substantially as described.

2. A pallet of sheet metal having a material-receiving face and a stiffening flange around the periphery thereof, the flange being unitary with the face and being uninterrupted.

3. A pallet of sheet metal having a substantially plane material-receiving face and a stiffening flange, the flange being unitary with the face and being uninterrupted.

4. A pallet of sheet metal having a material-receiving face and a stiffening flange around the periphery thereof, the flange being unitary with the face and being uninterrupted, and having at least certain portions which are rounded.

5. As an article of manufacture, a pallet having a body, and a peripheral reinforcing means integral with the body, the reinforcing means extending continuously throughout the sides and corners of the pallet and presenting a substantially unitary uninterrupted rim of material.

6. As an article of manufacture, a pallet having a body and a downwardly projecting peripheral flange, the flange being integral with the pallet and presenting a continuously extending rim of material throughout the sides and corners of the pallet.

7. As an article of manufacture, a pallet having a body and a downwardly projecting peripheral flange, the flange being integral with the pallet and presenting a continuously extending rim of material throughout the sides and corners of the pallet, the flange being curved inwardly on all four sides of the pallet.

8. As an article of manufacture, a pallet having a body and a downwardly projecting peripheral flange, the flange being integral with the pallet and presenting a continuously extending rim of material throughout the sides and corners of the pallet, the flange being curved inwardly on at least two sides of the pallet, the inwardly extending portions being secured to the body of the pallet.

9. As an article of manufacture, a pallet having a body and a downwardly projecting peripheral flange, the flange being integral with the pallet and presenting a continuously extending rim of material throughout the sides and corners of the pallet, the flange being curved inwardly on at least two sides of the pallet.

In testimony whereof I have hereunto set my hand.

CHARLES B. CUSHWA.